June 24, 1952 F. A. KROHM 2,601,662
WINDSHIELD WIPER ARM
Filed June 12, 1946

INVENTOR.
FRED A. KROHM
BY
Charles S. Penfold
ATTORNEY

Patented June 24, 1952

2,601,662

UNITED STATES PATENT OFFICE 2,601,662

WINDSHIELD WIPER ARM

Fred A. Krohm, Gary, Ind., assignor to Productive Inventions, Inc., a corporation of Indiana Application June 12, 1946, Serial No. 676,298

14 Claims. (Cl. 15—250)

This invention relates generally to windshield wiper arm constructions and more particularly is directed to improved bearing means for the resilient means employed for urging an outer section of the arm toward the windshield.

One type of wiper arm now in commercial use includes an inner shaft engaging section, an outer wiper carrying section pivotally connected to the inner section, and resilient means in the form of a leaf spring carried by the outer section which engages a cylindrical bearing rotatably mounted on axle means carried by the inner section to maintain the outer section in a normal operating position to press the wiper against the windshield and also permit movement of a non-operating or parking position.

When a roller is used, unless of non-rusting material and unless the axle pin is of non-rusting material, which adds to the cost of the assembly, rust and corrosion tends to accumulate within the bearing and freeze it against operation. This introduces within the hinge of the wiper arm a frictional resistance which creates a reluctance of the arm to follow freely the deflections in the contour of the glass to be wiped. This is particularly undesirable where windshields are curved and also prevents uniform resilient pressure against the glass under conditions where the actuating shaft of the windshield wiper motor is not installed at exact right angles to the glass with the result that on one stroke, the blade may travel downhill with relation to the arm hinge and it may travel correspondingly uphill on the return stroke.

It has been found that any excessive friction within the arm hinge assembly greatly interferes with the efficiency of the wiping of the windshield. Such friction becomes a seriously disabling factor where curved windshields are used and the arm hinge must function constantly through comparatively large arcs as the blade conforms to the curvature of the windshield.

Furthermore, the axle means for the cylindrical or roller bearing of such construction often buckles or bends when its extremities are being upset during the assembly operation, thereby causing the roller in many instances to bind and not rotate properly. The roller is permanently secured in place and cannot be replaced when excessively worn, without dismantling the arm structure. The arrangement is such that only a relatively small area of the peripheral surface of the roller bearing is actually engaged by the leaf spring. Moreover, such bearings are generally constructed from solid brass rod which has to be drilled and cut off to effective lengths. The cost of brass rod and machine operations has proven to be exceedingly expensive.

A major purpose of the subject invention, therefore, is to reduce friction at the arm hinge and particularly to eliminate the friction of the arm spring against the surface of a roller frozen to its axle as above described. This is accomplished by providing narrow contacts between the bearing means and the axle and by leaving exposed all of the axle except its narrow areas actually under contact and pressure from the spring. Precision dimensions of the axis are no longer necessary as where the roller is employed thus effecting a saving in cost.

Accordingly, one important object of the present invention is to provide an improved inexpensive bearing constructed of sheet metal which may freely rotate on the axle means irrespective of the buckling or irregularity resulting from the assembly operation above referred to.

A particular object of the invention is to provide improved means for limiting or controlling the pivotal movement of the outer wiper carrying section of the arm and pivotal movement of the bearing means.

Another important object of the invention is to provide bearing means which may be pressed or snapped into connection with the axle means, thereby promoting speed of assembly and replacement of a new bearing when needed.

A further object of the invention is to provide an arrangement in which the resilient means may rockingly engage the bearing means when the outer wiper carrying section is in a normal operating position and may slide with respect to the bearing means when the outer section is moved to an inoperative or parking position.

Other objects and advantages of the invention will become apparent after considering the description hereinafter set forth in conjunction with the drawing annexed hereto.

Figure 1:
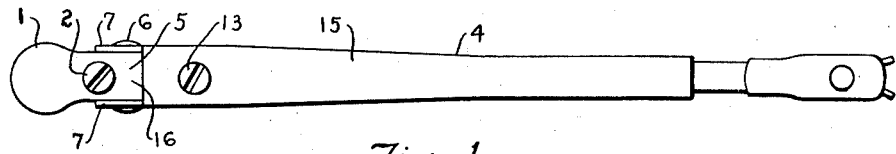
Figure 1 is a top view of a windshield wiper arm embodying the invention.

The windshield wiper arm embodying the present invention includes an inner shaft engaging section 1 provided with adjustable locking means 2 for attaching the section to a shaft 3 and an outer wiper carrying section 4 pivotally connected to a channeled radial extension 5 of section 1 by a pivot or rivet 6 which passes through the side walls 7 of the outer section and side walls 8 of extension 5.

The extremities of the side walls 8 of the radial extension 5 are preferably disposed substantially within the confines of the outer section and support axle means 9. The ends of the axle extend through holes provided therefor in the walls and are upset to firmly secure the axle in place. In certain applications it might be found desirable to journal the axle means in the extension. The improved bearing means generally designated 10 is pivotally mounted on the axle means 9 and supports the inner extremity of resilient means 11 preferably in the form of an elongated leaf spring. The outer extremity of the leaf spring may be secured to the outer section in any desirable manner but as herein illustrated, the spring is preferably mounted or carried by the outer section by means of a hanger 12 supporting auxiliary springs, which may be adjusted by means of a screw 13 for controlling the tension of the spring.

Figure 2:
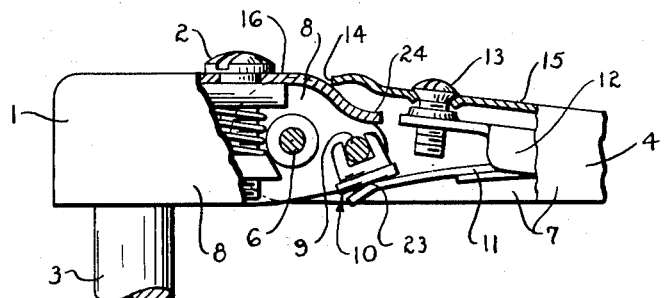
Figure 2 is an enlarged side view of a part of the arm with portions thereof in section illustrating the application of the invention.
Figure 3:
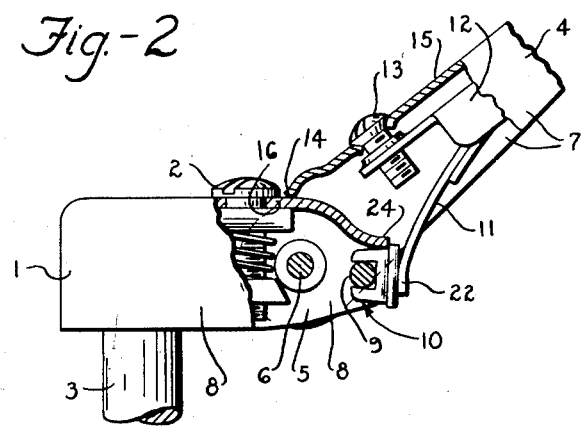
Figure 3 is a side view similar to Figure 2 showing the outer section of the arm in a parking position.
Figure 4:
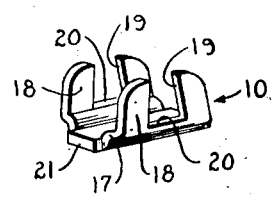
Figure 4 is a perspective view of the bearing means employed.

The outer section of the arm may be swung from its normal operating position as illustrated in Figure 2 to an inoperative or parked position as illustrated in Figure 3. Any desirable means may be employed for limiting outward movement of the outer section to a parking position but as illustrated the inset inner end margin 14 of the outer wall 15 of such section is preferably adapted to abut the bottom wall 16 of the inner arm section 1.

The improved bearing means generally designated 10 includes a base wall 17 and side walls 18. The side walls 18 are preferably provided with centrally disposed axle receiving recesses or slots 19 forming legs. The inner longitudinal marginal edges of the leg portions preferably converge in a direction toward the extremities of the legs, so that the bearing means may be pressed or snapped into place to cause the end margins 20 of the recesses to engage the axle means at spaced points adjacent the side walls 8 of the radial extension 5. Due to the character of the recesses or legs, the bearing means may freely rotate on the axle means with a minimum amount of friction and irrespective of any irregularity in the central portion of the axle means since the bearing points are spaced and located to obtain the greatest advantage for stability and balance.

The base wall 17 of the bearing means is preferably provided with a raised or elevated substantially rectangular planar bearing surface or track 21, disposed substantially tangentially to the axle means, which is engaged by the inner extremity of the leaf spring 11. The inner extremity of the spring 11 may be fashioned as desired but is preferably slightly angled to provide a flat portion 22 forming a bearing portion 23.

The bottom wall 16 of the inner section is also preferably provided with a stop portion 24 which may be engaged by the bearing means 10 to limit its pivotal movement beyond a predetermined range when the portion 14 of the outer section is in engagement with the wall portion 16. If found desirable, one or the other or both of the portions 14 and 24 may be omitted, in which event the parking position would be controlled by the flat portion 22 engaging the bearing surface or track of the bearing.

When the parts are properly assembled, the bearing portions 23 of the spring is adapted to rockingly engage the bearing surface or track 21 provided on the bearing means 10 to maintain the arm in a normal operating position and when the outer section of the arm is moved outwardly a predetermined distance or approaches the parking position, the spring will slide on the track of the bearing means to urge or flip the outer section over to the parking position as illustrated in Figure 3. In this parking position, the flat portion 22 of the spring engages the track.

As noted above, the attributes of the invention include the provision of improved bearing means which are simple in construction, inexpensive to manufacture and assemble, easily and quickly replaceable, and one which is positive and smooth in action.

Having thus described my invention, it is to be distinctly understood that although a preferred embodiment or modification of the invention has been illustrated and described, the invention is susceptible to other arrangements within the scope of the claims whereby to attain the objects set forth at the beginning of this specification.

I claim:

1. A windshield wiper arm comprising a head, an outer section pivotally connected to said head, abutment means carried by said head, resilient means carried by said outer section, and bearing means interposed between said abutment means and said resilient means, said bearing means including a pair of spaced wall portions engaging said abutment means and a portion bridging said side wall portions engaging said resilient means in a manner whereby said bearing means may pivot and said resilient means may slide with respect to said bearing means upon relative movement between said head and said outer section.

2. A windshield wiper arm comprising a head section, an outer section pivotally connected to said head section, abutment means carried by said head section, channel means having a pair of spaced wall portions engaging said abutment means and a portion bridging said side wall portions and forming a bearing, and resilient means carried by said outer section engaging said bearing in a manner whereby said channel means may pivot about the axis of said abutment means upon relative movement between said head and said outer sections.

3. A bearing for use in a windshield wiper arm comprising a base wall and a pair of side walls, said base wall providing a bearing surface, and each of said side walls being provided with a pair of legs for straddling pivot means.

4. An assembly for use in a windshield wiper arm comprising axle means, bearing means, and means for connecting said bearing means to said axle means, said connecting means comprising a pair of leg portions having yieldable projections constructed and arranged to yield when applied to straddle said axle means.

5. A windshield wiper arm comprising a head, an outer section pivotally connected to said head, abutment means carried by said head, resilient means carried by said outer section, and channel bearing means, said bearing means having a pair of side walls pivotally connecting the bearing means to said abutment means, said bearing means also having a base wall engaged by said resilient means in a manner whereby said resilient means may slide with respect to the bearing means when the latter pivots with respect to the abutment means.

6. A windshield wiper arm comprising a head, an outer section pivotally connected to said head, abutment means carried by said head, resilient means carried by said outer section, and channel bearing means, said bearing means having a pair of side walls pivotally connecting the bearing means to said abutment means, said bearing means also having a base wall engaged by said resilient means in a manner whereby said resilient means may slide with respect to the bearing means when the latter pivots with respect to the abutment means, and means on the head for limiting pivotal movement of the bearing means.

7. A windshield wiper arm comprising an inner section for receiving a drive shaft, an outer section pivotally connected to the inner section and providing a support for a wiper blade, abutment means carried by one section and resilient means carried by the other section, a channel bearing, said bearing having a pair of side walls pivotally connecting the bearing to the abutment means and also having a base wall engaging the resilient means in a manner whereby said bearing may pivot and said resilient means may slide with respect to the bearing means upon relative movement between the sections.

8. A windshield wiper arm comprising a head, an outer section pivotally connected to said head, abutment means carried by said head, resilient means carried by said outer section, bearing means interposed between said abutment means and said resilient means, said bearing means including a pair of spaced wall portions engaging said abutment means and a portion bridging said side wall portions engaging said resilient means in a manner whereby said bearing means may pivot and said resilient means may slide with respect to said bearing means upon relative movement between said head and said outer section, and means on said head for limiting pivotal movement of the bearing means.

9. A windshield wiper arm comprising a head section, an outer section pivotally connected to said head section, abutment means carried by said head section, channel means having a pair of spaced wall portions engaging said abutment means and a portion bridging said side wall portions and forming a bearing, resilient means carried by said outer section engaging said bearing in a manner whereby said channel means may pivot about the axis of said abutment means upon relative movement between said head and said outer sections, and means on said head for limiting pivotal movement of the bearing means.

10. A bearing for use in a windshield wiper arm comprising a base wall and a pair of side walls, said base wall being formed to provide a raised bearing surface, and each of said side walls being provided with a pair of legs for straddling pivot means.

11. A bearing for use in a windshield wiper arm comprising a base wall providing a bearing surface, and two pairs of yieldable legs extending from the base wall for straddling pivot means.

12. A windshield wiper arm comprising an inner section for connection with a drive shaft, an outer section pivotally connected to the inner section and provided with means for supporting a wiper blade, abutment carried by the inner section, a mounting secured to the outer section, resilient means carried by the outer section through connection with the mounting, a channel bearing, said bearing having a pair of side walls pivotally connecting the bearing with the abutment means and also having a base wall engaging the resilient means in a manner whereby said bearing may pivot and said resilient means may slide with respect to the bearing means upon relative movement between the sections.

13. A windshield wiper arm comprising an inner section for connection with a drive shaft, an outer section pivotally connected to the inner section, abutment carried by the inner section, a mounting secured to the outer section and provided with means for supporting a wiper blade, resilient means carried by the outer section through connection with the mounting, a channel bearing, said bearing having a pair of side walls pivotally connecting the bearing with the abutment means and also having a base wall engaging the resilient means in a manner whereby said bearing may pivot and said resilient means may slide with respect to the bearing means upon relative movement between the sections, and means for limiting pivotal movement of the channel bearing.

14. A windshield wiper arm comprising an inner section for connection with a drive shaft, an outer section pivotally connected to the inner section, abutment carried by the inner section, a mounting secured to the outer section and provided with means for supporting a wiper blade, resilient means carried by the outer section through connection with the mounting, a channel bearing, said bearing having a pair of side walls pivotally connecting the bearing with the abutment means and also having a base wall engaging the resilient means in a manner whereby said bearing may pivot and said resilient means may slide with respect to the bearing means upon relative movement between the sections, and means for adjusting the mounting for varying the tension of the resilient means.

FRED A. KROHM.

REFERENCES CITED

The following references are of record in the file of this patent:

UNITED STATES PATENTS

| Number | Name | Date |
|---|---|---|
| 1,058,203 | Spafford | Apr. 8, 1913 |
| 1,345,541 | Gates | July 6, 1920 |
| 1,573,618 | Laganke | Feb. 16, 1926 |
| 1,718,760 | Quackenbush | June 25, 1929 |
| 1,994,738 | Ritz-Woller | Mar. 19, 1935 |
| 2,229,718 | Bramming | Jan. 28, 1941 |
| 2,274,286 | Wieland | Feb. 24, 1942 |
| 2,320,660 | Schaal | June 1, 1943 |